United States Patent Office 3,253,934
Patented May 31, 1966

3,253,934
VITREOUS COMPOSITIONS OF MATTER
Yves Georges Godron, Paris, France, assignor to Compagnie de Saint-Gobain, Neuilly-sur-Seine, France
No Drawing. Filed Apr. 11, 1962, Ser. No. 189,659
Claims priority, application France, May 25, 1956, 715,188, Patent 1,152,757; May 6, 1957, 737,903, Patent 71,509
9 Claims. (Cl. 106—47)

This invention relates to vitreous compositions of matter, an important use of which is as lubricant glasses. This is a continuation in part of application Serial No. 660,470, now abandoned.

An important use of glass has been in the lubrication of metallic bodies at relatively high temperatures, for instance, in the extrusion of metals wherein a metal ingot is pushed or drawn through a die to increase its length and modify or reduce its transverse section. Many problems have beset this process, including the problem of securing lubrication of the ingot throughout its whole length. Another problem has been to provide a vitreous composition of good lubricating power, the viscosity of which can be changed in order to adapt it to particular uses without altering its qualitative composition and consequently its desirable properties. Yet another problem has been to prepare a vitreous lubricant, the raw materials of which can be readily vitrified but in which the vitreous product withstands relatively high temperatures and pressures very well.

The objects of the invention are, generally, to solve the problems which have been indicated hereinabove and to provide vitreous compositions, glasses, which may be generally used to lubricate metals during extrusion, particularly at relatively high temperatures, and which have at these temperatures convenient viscosity and an attackability by water and other common chemical agents which permits ready removal by washing after use.

The objects of the invention are accomplished, generally, speaking, by glass having the basic composition in mole percent

| | Percent |
|---|---|
| $Al_2O_3$ | 10–20 |
| $R_2O$ | 9–33 |
| RO | 16–20 |
| $P_2O_5$ | 29–61 | in which $R_2O$ is an alkali metal oxide, RO is a divalent metal oxide of which CaO is not over 15 mole percent and PbO is not over 5 mole percent, and in which $B_2O_3$ may replace $P_2O_5$ mole for mole up to 10% of the basic composition, in which a trivalent metal oxide $R_2O_3$ other than $B_2O_3$ and $Al_2O_3$, may replace $Al_2O_3$ up to 5% of the basic composition provided that $Al_2O_3$ is at least equal to 10%, and $R_2O+RO$ is less than 50% of the basic composition.

In these compositions the basic formulas are maintained in their integrity so that the mole content of each ingredient (alone or with its permissible amount and type of substituent) is always within the limits stated above. Thus, as BaO is taken to be 16 mole percent the resulting composition is:

| | Percent by wt. |
|---|---|
| $P_2O_5$ | 40.25–66.95 |
| $Al_2O_3$ | 7.90–18.65 |
| $Na_2O$ | 4.25–18.70 |
| BaO | 18.70–22.40 | when $Na_2O$ is used as the alkali metal oxide, but when $K_2O$ is used as the alkali metal oxide the composition is

| | Percent by wt. |
|---|---|
| $P_2O_5$ | 36.70–64.90 |
| $Al_2O_3$ | 7.65–17.00 |
| $K_2O$ | 6.30–25.85 |
| BaO | 18.30–20.45 | when BaO is 20 molecular percent and $Na_2O$ is used the composition is

| | Percent by wt. |
|---|---|
| $P_2O_5$ | 38.00–65.15 |
| $Al_2O_3$ | 7.65–18.20 |
| $Na_2O$ | 4.20–16.55 |
| BaO | 23.00–27.23 | when $K_2O$ is used with 20% BaO the component is

| | Percent by wt. |
|---|---|
| $P_2O_5$ | 35–63.75 |
| $Al_2O_3$ | 7.50–16.75 |
| $K_2O$ | 6.25–23.15 |
| BaO | 22.50–25.10 |

As oxides of alkali metals, the ones principally used are sodium oxide, $Na_2O$, or potassium oxide, $K_2O$, or a mixture of sodium oxide, potassium oxide and lithium oxide, $Li_2O$, or a mixture of any two of these three oxides, the quantity of the different alkali metal oxides being varied to vary the alterability or the viscosity of the glass.

If it is desired to increase the resistance of the glass to atmospheric and chemical agents, one replaces a small quantity of phosphoric anhydride, for example, 5% to 10%, in molecular percentage in relation to the whole composition, by boric anhydride, $B_2O_3$. Thus, if one wishes the ingot to be readily cleaned by water alone or containing chemical agents which will aid and act on the glass, one reduced the content of $B_2O_3$.

Accordingly, one may equally replace a small amount of alumina, up to about 5%, in molecular percentage in relation to the whole composition, by oxides of the group $R_2O_3$, of which iron oxide, $Fe_2O_3$, and chromium oxide, $Cr_2O_3$, are examples. However, the percentage of $Al_2O_3$ is to be maintained at least equal to 10%.

The oxides of divalent metals which are included in the composition, such as BaO, CaO, MgO, ZnO, make it possible to alter the properties of the composition for different uses without losing those desirable properties by a change in the qualitative composition of the glass. For example, the attackability of the glass by water is reduced when the content of zinc oxide or magnesia is increased. Also, the viscosity is increased when in the mixture of divalent oxides, the zinc oxide is replaced by at least one oxide of the group comprising magnesium and calcium oxides, and when magnesia is substituted for at least one of the oxides of barium and calcium. By this ability to change the viscosity, one adapts the composition to use at different temperatures and pressures. The ease of vitrification is improved by a reduction in the content of lime, in particular not above 15% in molecular percentage.

In order to obtain glasses having a relatively high viscosity suitable for their use as lubricants in the extrusion of metals at high temperatures, it is of interest to avoid the presence of PbO or at least to reduce its content to at most 5%. Due to this low content in PbO, the layer of glass on the extruded metal may be removed more easily.

The glasses according to the present invention are particularly useful in drawing metals at high temperatures from about 650° to 950° C.

The following examples illustrate the preparation of the composition according to the invention without limiting the generality of what is elsewhere herein described and claimed:

EXAMPLE 1

The following composition was melted at about 1250° C. in a refractory silico-aluminous crucible and was poured on a table to cool:

| | Parts by wt. |
|---|---|
| Trisodium phosphate | 35.7 |
| Diammonium phosphate | 69.0 |
| Borax | 14.1 |
| Hydrated alumina | 31.4 |
| Zinc oxide | 6.2 |
| Potassium carbonate | 13.45 |
| Magnesium carbonate | 10.75 |

The molecular composition of the glass thus made was as follows:

| | Molecular percentages |
|---|---|
| $P_2O_5$ (phosphoric anhydride) | 27.4 |
| $B_2O_3$ (boric anhydride) | 6.9 |
| $Al_2O_3$ (alumina) | 18.9 |
| ZnO (zinc oxide) | 7.2 |
| MgO (magnesia) | 12.0 |
| $Na_2O$ (sodium oxide) | 18.5 |
| $K_2O$ (potassium oxide) | 9.1 |

Such a glass can be used as a lubricant for the extrusion of red copper at 800° C., the speed of the extrusion being 6 meters per second. The cleaning of the extruded metal may be obtained by chemical agents such as acidulated water.

EXAMPLE 2

The following mixture was melted at about 1240° C. in a crucible similar to that of Example 1 and was similarly poured on a table to cool:

| | Parts by wt. |
|---|---|
| Borax | 13.7 |
| Trisodium phosphate | 25.2 |
| Diammonium phosphate | 73.5 |
| Hydrated alumina | 19.9 |
| Zinc oxide | 10.0 |
| Barium carbonate | 10.3 |
| Potassium carbonate | 19.1 |

The resulting glass had the following molecular composition:

| | Molecular percentages |
|---|---|
| $P_2O_5$ | 32.3 |
| $B_2O_3$ | 7.9 |
| $Al_2O_3$ | 14.0 |
| ZnO | 13.7 |
| BaO | 5.7 |
| $Na_2O$ | 15.9 |
| $K_2O$ | 10.5 |

A particular advantage of the invention resides in the ability to make desirable alterations in its properties, particularly to alter its attackability by water without basic alteration of its lubricating effect, and to alter its viscosity for particular uses without making a basic alteration in its predominant qualities.

EXAMPLE 3

The extrusion of a billet of silicon bronzes heated to equalize to 850° C. is performed with good results with glass having the following composition in molecular percentages:

| | Percent |
|---|---|
| $P_2O_5$ | 35 |
| $B_2O_3$ | 9 |
| $Al_2O_3$ | 17 |
| ZnO | 4 |
| CaO | 8 |
| MgO | 5 |
| $K_2O$ | 22 |

EXAMPLE 4

In order to lubricate another kind of silicon bronzes in drawing at 900° C., a glass having the following composition in molecular percentages may be used:

| | Percent |
|---|---|
| $P_2O_5$ | 33 |
| $B_2O_3$ | 9 |
| $Al_2O_3$ | 16 |
| $Fe_2O_3$ | 3 |
| BaO | 6 |
| CaO | 4 |
| MgO | 4 |
| ZnO | 5 |
| $K_2O$ | 20 |

As many apparently widely different embodiments of the present invention may be made without departing from the spirit and scope thereof, it is to be understood that the invention is not limited to the specific embodiments.

What is claimed is:

1. Glass approximating the molecular composition:

| | |
|---|---|
| $P_2O_5$ | 27.4 |
| $B_2O_3$ | 6.9 |
| $Al_2O_3$ | 18.9 |
| ZnO | 7.2 |
| MgO | 12.0 |
| $Na_2O$ | 18.5 |
| $K_2O$ | 9.1 |

2. Glass approximating the molecular composition:

| | |
|---|---|
| $P_2O_5$ | 32.3 |
| $B_2O_3$ | 7.9 |
| $Al_2O_3$ | 14.0 |
| ZnO | 13.7 |
| BaO | 5.7 |
| $Na_2O$ | 15.9 |
| $K_2O$ | 10.5 |

3. Glass having the basic composition in mole percent:

| | Percent |
|---|---|
| $P_2O_5$ | 29–61 |
| $Al_2O_3$ | 10–20 |
| At least one alkali metal oxide | 9–33 |
| One divalent metal oxide from the group consisting of BaO, MgO and ZnO | 16–20 | in which $B_2O_3$ may replace $P_2O_5$ mole for mole up to 10% of the basic composition, in which at least one of the group of trivalent metal oxides consisting of $Fe_2O_3$ and $Cr_2O_3$ may replace $Al_2O_3$ up to 5% of the basic composition, provided that $Al_2O_3$ is not less than 10%, and in which said alkali metal oxide plus said divalent metal oxide is less than 50% of the basic composition.

4. Glass according to claim 3 in which the divalent metal oxide is BaO and in which up to 5 mole percent of the BaO may be replaced by PbO mole for mole.

5. Glass having the basic composition in mole percent:

| | Percent |
|---|---|
| $P_2O_5$ | 29–61 |
| $Al_2O_3$ | 10–20 |
| At least one alkali metal oxide | 9–33 |
| At least one divalent metal oxide from the group consisting of CaO, MgO and ZnO | 16–20 | in which CaO is not over 15 mole percent, in which $B_2O_3$ may replace $P_2O_5$ mole for mole up to 10% of the basic composition, in which at least one of the group of trivalent metal oxides consisting of $Fe_2O_3$ and $Cr_2O_3$ may replace $Al_2O_3$ up to 5% of the basic composition, provided that $Al_2O_3$ is not less than 10%, and in which said alkali metal oxide plus said divalent metal oxide is less than 50% of the basic composition.

6. Glass having the basic composition in mole percent:

| | Percent |
|---|---|
| $P_2O_5$ | 29–61 |
| $Al_2O_3$ | 10–20 |
| At least one alkali metal oxide | 9–33 |
| BaO and one other divalent metal oxide from the group consisting of CaO and MgO, provided that CaO is not over 15 mole percent | 16–20 | in which PbO may replace one of the divalent metal oxides mole for mole up to 5 mole percent, in which $B_2O_3$ may replace $P_2O_5$ mole for mole up to 10% of the basic composition, in which at least one of the group of trivalent metal oxides consisting of $Fe_2O_3$ and $Cr_2O_3$ may replace $Al_2O_3$ up to 5% of the basic composition, provided that $Al_2O_3$ is not less than 10%, and in which said alkali metal oxide plus said divalent metal oxides is less than 50% of the basic composition.

7. Glass having the basic composition in mole percent:

| | Percent |
|---|---|
| $P_2O_5$ | 29–61 |
| $Al_2O_3$ | 10–20 |
| At least one alkali metal oxide | 9–33 |
| ZnO and one other divalent metal oxide from the group consisting of BaO, CaO and MgO, provided that CaO is not over 15 mole percent | 16–20 | in which PbO may replace one of the divalent metal oxides mole for mole up to 5 mole percent, in which $B_2O_3$ may replace $P_2O_5$ mole for mole up to 10% of the basic composition, in which at least one of the group of trivalent metal oxides consisting of $Fe_2O_3$ and $Cr_2O_3$ may replace $Al_2O_3$ up to 5% of the basic composition, provided that $Al_2O_3$ is not less than 10%, and in which said alkali metal oxide plus said divalent metal oxides is less than 50% of the basic composition.

8. Glass approximating the molecular composition:

| | Percent |
|---|---|
| $P_2O_5$ | 35 |
| $B_2O_3$ | 9 |
| $Al_2O_3$ | 17 |
| ZnO | 4 |
| CaO | 8 |
| MgO | 5 |
| $K_2O$ | 22 |

9. Glass approximating the molecular composition:

| | Percent |
|---|---|
| $P_2O_5$ | 33 |
| $B_2O_3$ | 9 |
| $Al_2O_3$ | 16 |
| $Fe_2O_3$ | 3 |
| BaO | 6 |
| CaO | 4 |
| MgO | 4 |
| ZnO | 5 |
| $K_2O$ | 20 |

References Cited by the Examiner

UNITED STATES PATENTS

| | | | |
|---|---|---|---|
| 2,047,237 | 7/1936 | Updegraff | 207—10 |
| 2,227,082 | 12/1940 | Grimm et al. | 106—47 |
| 2,716,069 | 8/1955 | Pincus | 106—47 |
| 2,723,203 | 11/1955 | Weissenberg et al. | 106—47 |
| 2,737,293 | 3/1956 | Beliveau | 207—10 |
| 2,920,972 | 1/1960 | Godron | 106—47 |

TOBIAS E. LEVOW, *Primary Examiner.*

WILLIAM W. DYER, JR., *Examiner.*

E. D. O'CONNOR, H. McCARTHY,
*Assistant Examiners.*